(12) United States Patent
Takada et al.

(10) Patent No.: US 12,438,459 B2
(45) Date of Patent: Oct. 7, 2025

(54) CONTROL DEVICE, POWER CONVERSION DEVICE, AND CONTROL METHOD

(71) Applicant: Mitsubishi Electric Corporation, Tokyo (JP)

(72) Inventors: Mitsuhiro Takada, Tokyo (JP); Ryotaro Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 92 days.

(21) Appl. No.: 18/574,181

(22) PCT Filed: Jul. 30, 2021

(86) PCT No.: PCT/JP2021/028421
§ 371 (c)(1),
(2) Date: Dec. 26, 2023

(87) PCT Pub. No.: WO2023/007721
PCT Pub. Date: Feb. 2, 2023

(65) Prior Publication Data
US 2024/0243661 A1    Jul. 18, 2024

(51) Int. Cl.
*H02M 3/156*     (2006.01)
(52) U.S. Cl.
CPC .................. *H02M 3/156* (2013.01)
(58) Field of Classification Search
CPC .......... H02M 3/156; H02M 1/32; H02M 1/36; H02M 3/155; H02M 7/48; H02M 3/00
USPC ....... 361/18; 363/97, 49; 323/283, 288, 222, 323/285, 271, 284, 282
See application file for complete search history.

(56) References Cited

U.S. PATENT DOCUMENTS 6,934,141 B2 *   8/2005   Hamano ................ H01H 9/542
                                                  361/160
9,564,752 B2 *   2/2017   Hamano ................ H02H 9/001

FOREIGN PATENT DOCUMENTS

JP    2003208232 A    7/2003
JP    2016010193 A *  1/2016

OTHER PUBLICATIONS

International Search Report (PCT/ISA/210) with translation and Written Opinion (PCT/ISA/237) mailed on Oct. 26, 2021, by the Japan Patent Office as the International Searching Authority for International Application No. PCT/JP2021/028421. (8 pages).

* cited by examiner

*Primary Examiner* — Elim Ortiz
(74) *Attorney, Agent, or Firm* — Buchanan Ingersoll & Rooney PC

(57) ABSTRACT

A control device includes a target voltage outputter that outputs a target voltage that is a target value of output voltage of a power conversion circuit and an element controller that controls a switching element in accordance with the target voltage. Upon acquisition of an operation command that provides an instruction for startup of the power conversion circuit, the target voltage outputter raises the target voltage to a startup voltage that is below a rated voltage range of the power conversion circuit. In a case where at least one of the load devices has started up after acquisition of the operation command, the target voltage outputter raises the target voltage to an operating voltage that is greater than the startup voltage and is within the rated voltage range of the power conversion circuit.

20 Claims, 12 Drawing Sheets

CONTROL DEVICE, POWER CONVERSION DEVICE, AND CONTROL METHOD

TECHNICAL FIELD

The present disclosure relates to a control device, a power conversion device, and a control method.

BACKGROUND ART

Some railway vehicles are provided with a power conversion device that converts power supplied from a power source into power to be supplied to load devices, such as lighting devices, air conditioners, storage battery devices, and the like, and supplies the power resulting from the conversion to the load devices. An example of this type of power conversion device is disclosed in Patent Literature 1. This power conversion device includes a power conversion circuit including switching elements and a control circuit that controls the switching elements.

CITATION LIST

Patent Literature

Patent Literature 1: Unexamined Japanese Patent Application Publication No. 2003-208232

SUMMARY OF INVENTION

Technical Problem

In an example of the power conversion device disclosed in Patent Literature 1, output voltage of the power conversion circuit rises stepwise at fixed time intervals and reaches a rated voltage. Electrical connection of a load device to the power conversion circuit before the power conversion circuit reaches the rated voltage suppresses flow of inrush current into the load device. In a case where the power conversion device supplies power to a plurality of load devices, timings of startup of the load devices differ from each other. Thus, turn-on timings of contactors provided for their respective load devices may differ from each other. In this case, if a contactor is turned on after the output voltage of the power conversion circuit reaches the rated voltage, excessive inrush current might flow in the load devices via this contactor connected to the power conversion circuit. Such circumstances may occur not only in the power conversion device mounted in the railway vehicle, but also in any power conversion device that supplies power to a plurality of load devices The present disclosure has been made in view of the above circumstances, and an objective of the present disclosure is to provide a control device, a power conversion device, and a control method that can reduce inrush current in load devices that receive supply of power from the power conversion device.

Solution to Problem

To achieve the above objective, a control device of the present disclosure is a control device for controlling one or more switching elements included in a power conversion circuit that converts supplied power into power to be supplied to load devices and supplies the power resulting from the conversion to the load devices. The control device includes a target voltage outputter and an element controller. The target voltage outputter outputs a target voltage that is a target value of output voltage of the power conversion circuit. The element controller controls the one or more switching elements in accordance with the target voltage. Upon acquisition of an operation command that provides instruction for startup of the power conversion circuit, the target voltage outputter raises the target voltage to a startup voltage that is below a rated voltage range of the power conversion circuit. In a case where at least one of the load devices starts up after acquisition of the operation command, the target voltage outputter raises the target voltage to an operating voltage that is greater than the startup voltage and is within the rated voltage range of the power conversion circuit.

Advantageous Effects of Invention

In a case where at least one of the load devices starts up after raising of the target voltage to the startup voltage that is below the rated voltage range of the power conversion circuit, the target voltage outputter included in the control device raises the target voltage to an operating voltage that is greater than the startup voltage and is within the rated voltage range. This can reduce inrush current in the load devices.

DESCRIPTION OF EMBODIMENTS

A control device, a power conversion device, and a control method according to embodiments of the present

Embodiment 1

Figure 1:
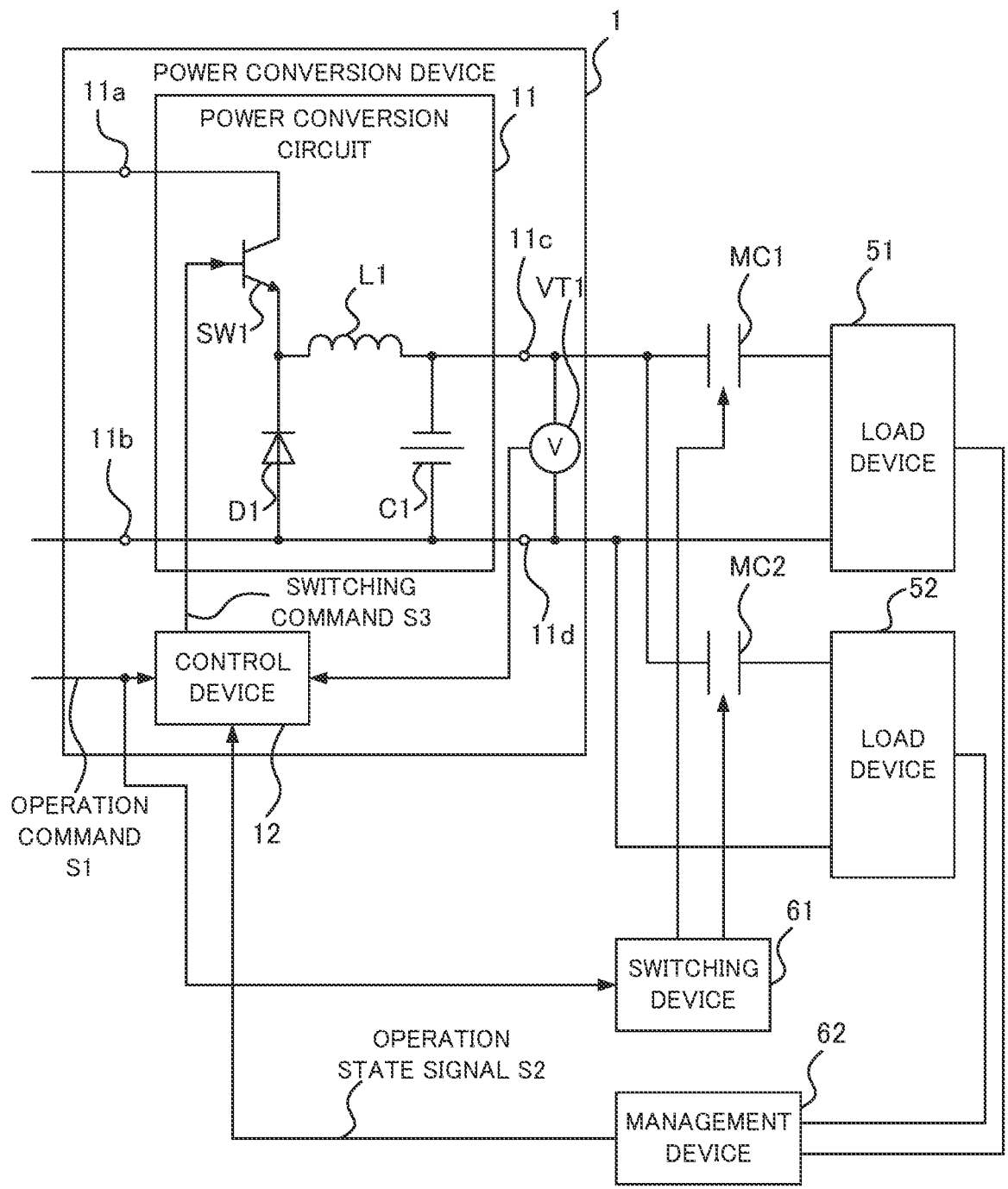
FIG. 1 is a block diagram of a power conversion device according to Embodiment 1.

A power conversion device 1 according to Embodiment 1 is described using as an example a power conversion device mounted in a railway vehicle. The power conversion device 1 illustrated in FIG. 1 converts power supplied from an unillustrated power source into power to be supplied to load devices 51 and 52, and supplies the power resulting from the conversion to the load devices 51 and 52. For example, the power conversion device 1 includes a step-down direct current (DC)-DC converter.

The load devices 51 and 52 are, for example, lighting devices, air conditioners, storage battery devices, and the like. The load devices 51 and 52 are electrically connected to the power conversion device 1 via their respective contactors MC1 and MC2.

The contactors MC1 and MC2 are, for example, DC electro-magnetic contactors and are controlled by a switching device 61. Upon turn-on of the contactor MC1 by the switching device 61, the load device 51 is electrically connected to the power conversion device 1. Upon turn-off of the contactor MC1 by the switching device 61, the load device 51 is electrically disconnected from the power conversion device 1. Upon turn-on of the contactor MC2 by the switching device 61, the load device 52 is electrically connected to the power conversion device 1. Upon turn-off of the contactor MC2 by the switching device 61, the load device 52 is electrically disconnected from the power conversion device 1.

The switching device 61 acquires an operation command S1 that provides an instruction for operation of a power conversion circuit 11. The operation command S1 is a signal to provide an instruction for startup or stop of the power conversion circuit 11. For example, the operation command S1 is a signal that is at a high (H) level at start of operation of a railway vehicle and at a low (L) level at end of the operation. Upon change of the operation command S1 to the H level, the switching device 61 turns on the contactors MC1 and MC2 at a predetermined timing and in a predetermined order. In Embodiment 1, upon change of the operation command S1 to the H level, the switching device 61 turns on the contactor MC1. Then, upon passage of a fixed time from turn-on of the contactor MC1, the switching device 61 turns on the contactor MC2.

The management device 62 controls the load devices 51 and 52 to monitor operation states of the load devices 51 and 52. Specific examples of the operation states to be monitored by the management device 62 include whether or not the load devices 51 and 52 have started up or are in operation. The management device 62 transmits to the control device 12 an operation state signal S2 indicating whether or not the load devices 51 and 52 have started up.

To reduce inrush current flowing in the load devices 51 and 52 when the contactors MC1 and MC2 are turned on, the power conversion device 1 raises the output voltage to a voltage that allows startup of the load devices 51 and 52, and then, upon startup of the load devices 51 and 52, raises the output voltage to a voltage enabling operation of the load devices 51 and 52. Configuration of the power conversion device 1 is described below.

The power conversion device 1 includes the power conversion circuit 11 that steps down input voltage applied through input terminals 11a and 11b and outputs the stepped-down voltage through output terminals 11c and 11d, a voltage measurer VT1 that measures a value of the output voltage of the power conversion circuit 11, and a control device 12 that controls the power conversion circuit 11.

The power conversion circuit 11 includes a switching element SW1 having one end connected to the input terminal 11a, and a reactor L1 having one end connected to the switching element SW1 and another end connected to the output terminal 11C. The power conversion circuit 11 further includes a capacitor C1 connected between the output terminals 11c and 11d, and a diode D1 having an anode connected to a point of connection between the input terminal 11b and the output terminal 11d and a cathode connected to a point of connection between the switching element SW1 and the reactor L1.

The switching element SW1 is, for example, an insulated gate bipolar transistor (IGBT). A collector terminal of the switching element SW1 is connected to the input terminal 11a. An emitter terminal of the switching element SW1 is connected to one end of the reactor L1. A switching command S3 output by the control device 12 is supplied to a gate terminal of the switching element SW1. The switching element SW1 is turned on and off in accordance with the switching command S3, which is a voltage signal.

The voltage measurer VT1 is connected to the output terminals 11C and 11D of the power conversion circuit 11, and measures a value of the output voltage of the power conversion circuit 11 and sends the measured value to the control device 12.

Figure 2:
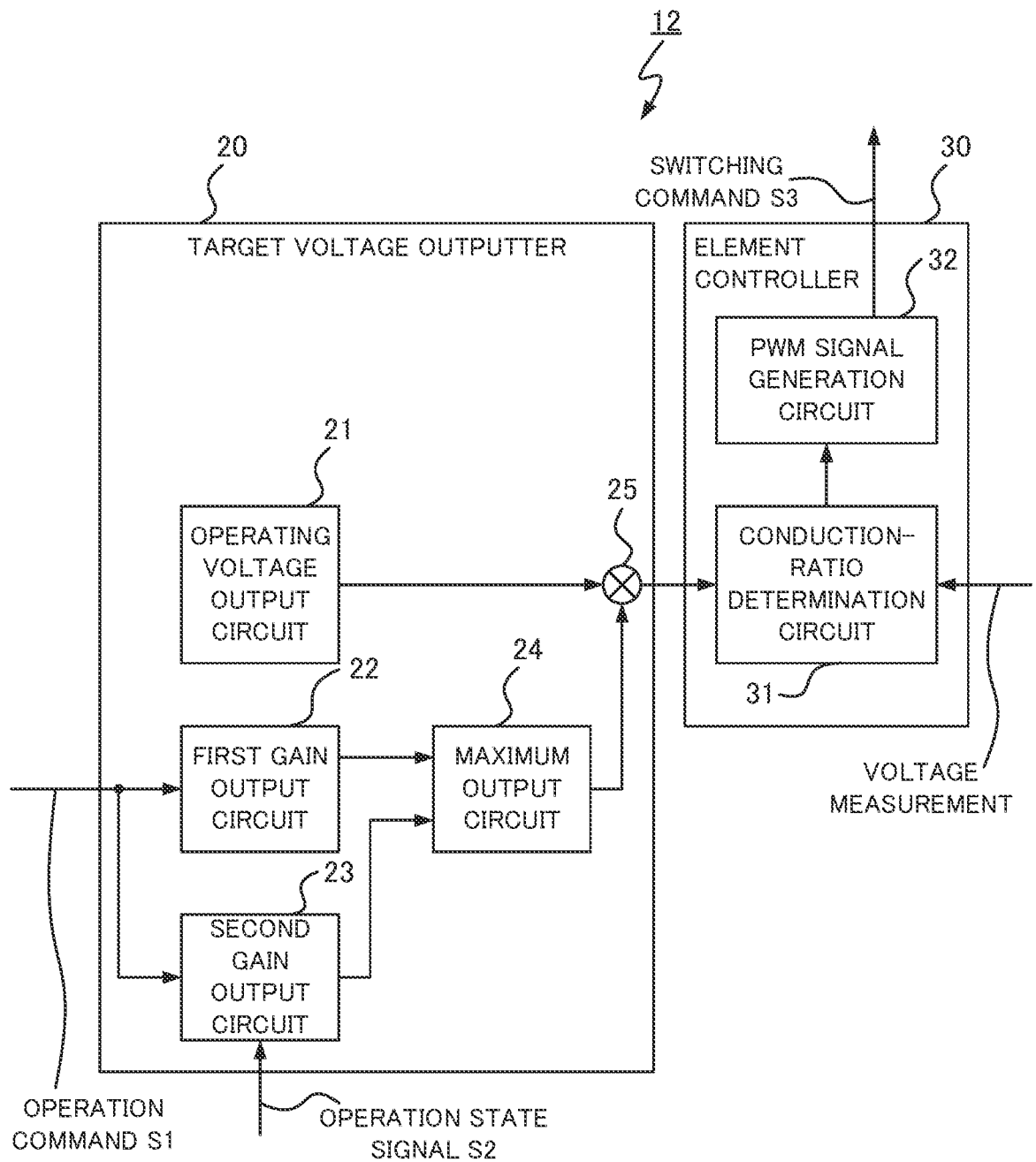
FIG. 2 is a block diagram of a control device according to Embodiment 1.

As illustrated in FIG. 2, the control device 12 includes a target voltage outputter 20 that outputs a target voltage that is a target value of the output voltage of the power conversion circuit 11, and an element controller 30 that generates the switching command S3 for controlling the switching element SW1 in accordance with the target voltage output by the target voltage outputter 20.

The target voltage outputter 20 includes an operating voltage output circuit 21 that outputs an operating voltage that is a target value of output voltage of the power conversion device 1, that is, the output voltage of the power conversion circuit 11, enabling operation of the load devices 51 and 52. The target voltage outputter 20 further includes a first gain output circuit 22 that outputs a value of a first gain that is a value equal to or greater than 0 and less than 1, and a second gain output circuit 23 that outputs a value of a second gain that is a value equal to or greater than 0 and equal to or less than 1. The target voltage outputter 20 further includes a maximum output circuit 24 that outputs a greater value among the output value of the first gain output circuit 22 and the output value of the second gain output circuit 23, and a multiplier 25 that multiplies the output value of the operating voltage output circuit 21 by the output value of the maximum output circuit 24.

The operating voltage output circuit 21 outputs the operating voltage, which is a predetermined value, specifically, a value in a rated voltage range of the power conversion circuit 11. The rated voltage range indicates a range of the output voltage of the power conversion device 1 enabling operation of the load devices 51 and 52 that receive supply of power from the power conversion circuit 11. The operating voltage output circuit 21 has a preset operating voltage, and maintains a constant output that is in accordance with the operating voltage.

The first gain output circuit 22 outputs a value of the first gain that is 0 while the operation command S1 is at the L level. Upon change of the operation command S1 to the H level, the first gain output circuit 22 increases the value of the first gain to a maximum of the first gain that is a value equal to or great than 0 and less than 1. The maximum of the first gain is determined in accordance with a maximum of current allowable by the load devices 51 and 52. For example, upon acquisition of the operation command S1 at the H level, the first gain output circuit 22 outputs a value of the first gain that increases linearly with time since start of the increase from 0 to 0.6.

The second gain output circuit 23 acquires the operation command S1 and the operation state signal S2. The second gain output circuit 23 outputs a value of the second gain that is 0 while the operation command S1 is at the L level or the operation state signal S2 indicates that at least one of the load devices 51 and 52 is not starting up. In a case where the operation command S1 changes to the H level and the operation state signal S2 indicates that both of the load devices 51 and 52 have started up, the second gain output circuit 23 increases the value of the second gain from 0 to 1. For example, upon acquisition of the operation command S1 being at the H level and the operation state signal S2 indicating that the load devices 51 and 52 have started up, the second gain output circuit 23 outputs the value of the second gain that increases linearly with time since start of the increase from 0 to 1.

The maximum output circuit 24 outputs to the multiplier 25 a greater value among the output value of the first gain output circuit 22 and the output value of the second gain output circuit 23. As described above, upon change of the operation command S1 to the H level, the value of the first gain output by the first gain output circuit 22 starts to increase from 0, but the value of the second gain output by the second gain output circuit 23 is kept 0 while the operation state signal S2 indicates that at least one of the load devices 51 and 52 is not starting up. In this case, since the value of the first gain is greater than the value of the second gain, the maximum output circuit 24 outputs the value of the first gain to the multiplier 25.

Then, upon the operation state signal S2 indicating that both of the load devices 51 and 52 have started up, the value of the second gain starts to increase from 0. While the value of the first gain is equal to or greater than the value of the second gain, the maximum output circuit 24 outputs to the multiplier 25 the value of the first gain output by the first gain output circuit 22. Upon the value of the second gain exceeding the value of the first gain, that is, upon the value of the second gain exceeding the maximum of the first gain, the maximum output circuit 24 outputs to the multiplier 25 the value of the second gain output by the second gain output circuit 23 since the value of the second gain is greater than the value of the first gain.

The multiplier 25 multiplies the output value of the operating voltage output circuit 21 by the output value of the maximum output circuit 24, and sends the multiplication result to the element controller 30. The output value of the multiplier 25 is an output value of the target voltage outputter 20 and a target value of the output voltage of the power conversion circuit 11. While the output value of the maximum output circuit 24 is less than 1, the output value of the multiplier 25 is a value lower than the operating voltage.

It is assumed that the output value of the multiplier 25 in a case where the output value of the maximum output circuit 24 is the maximum of the first gain is a startup voltage that is lower than the lower limit of the rated voltage range of the power conversion circuit 11. The startup voltage is a value that is lower than the lower limit of the rated voltage range enough to be able to sufficiently reduce the inrush current into the load devices 51 and 52. The startup voltage is set to a value equal to or greater than the lower limit of the power conversion circuit 11 enabling startup of the load devices 51 and 52. In a case where the output value of the maximum output circuit 24 is 1, the output value of the multiplier 25 is the operating voltage that is greater than the startup voltage and is included in the rated voltage range of the power conversion circuit 11.

The element controller 30 includes a conduction-ratio determination circuit 31 that determines a conduction ratio of the switching element SW1 in accordance with the output value of the target voltage outputter 20 and the measured value of the voltage measurer VT1, and a pulse width modulation (PWM) signal generation circuit 32 that generates, in accordance with the conduction ratio determined by the conduction-ratio determination circuit 31, the switching command S3 that is a PWM signal to be supplied to the switching element SW1.

The conduction-ratio determination circuit 31 determines, in accordance with the output value of the target voltage outputter 20 and the measured value of the voltage measurer VT1, the conduction ratio at which the output voltage of the power conversion circuit 11 approaches the target voltage output by the target power outputter 20, and sends the conduction ratio to the PWM signal generation circuit 32.

The PWM signal generation circuit 32 generates, in accordance with the conduction ratio obtained from the conduction-ratio determination circuit 31, the switching command S3 for turning-on of the switching element SW1 in a switching period during time obtained by multiplying the switching period by the conduction ratio. Then, the PWM signal generation circuit 32 supplies the switching command S3 to the gate terminal of the switching element SW1.

Figure 3:
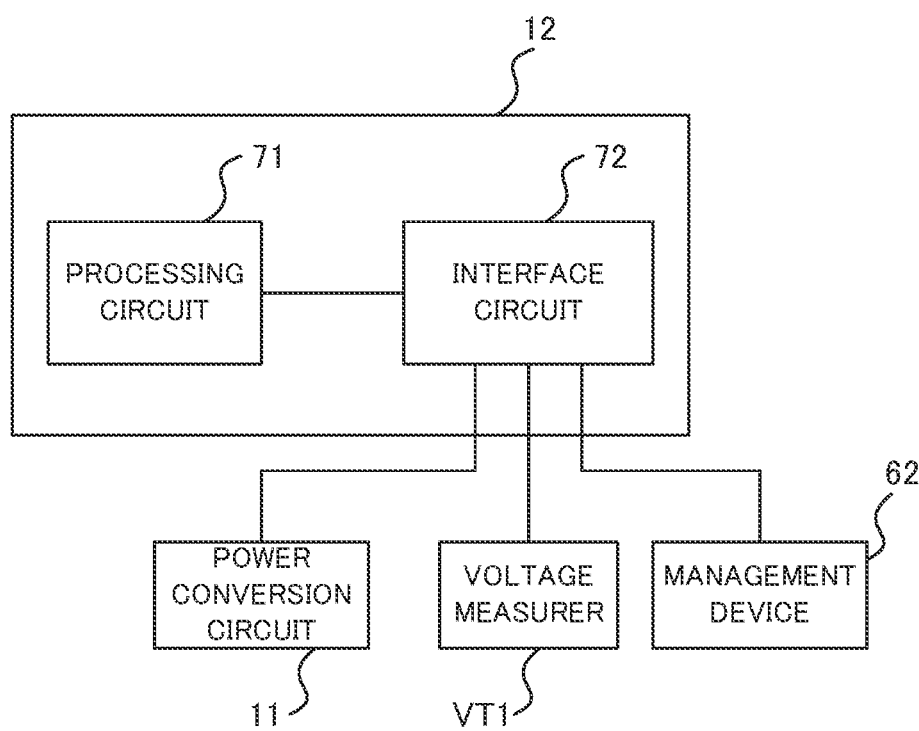
FIG. 3 is a hardware configuration of the control device according to Embodiment 1.

FIG. 3 illustrates a hardware configuration of the control device 12 having the above configuration. As illustrated in FIG. 3, the control device 12 can be implemented by a processing circuit 71. The processing circuit 71 is connected through an interface circuit 72 to the power conversion circuit 11, specifically, the switching element SW1, the voltage measurer VT1, and the management device 62. In a case where the processing circuit 71 is dedicated hardware, the processing circuit 71 is, for example, a single circuit, a complex circuit, a programed processor, a parallel programmed processor, an application specific integrated circuit (ASIC), a field programmable gate array (FPGA), or a combination thereof. Components of the control device 12 may be implemented by a separate processing circuits 71 or by a common processing circuit 71.

Figure 4:
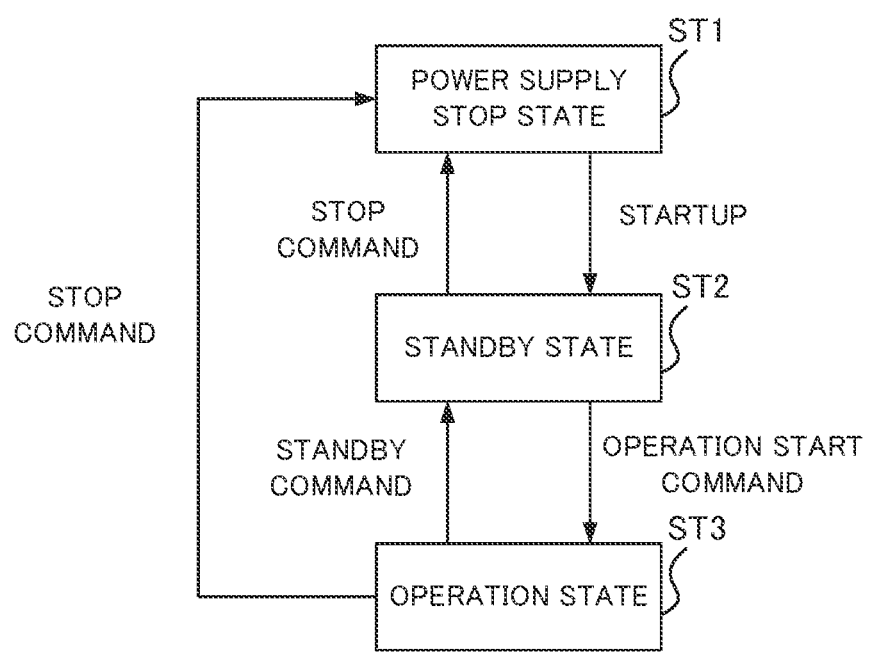
FIG. 4 is a state transition diagram of a load device in Embodiment 1.

The load devices 51 and 52 that receive supply of power from the power conversion device 1 having the above configuration are controlled and monitored by the management device 62, and operate in accordance with a state transition diagram illustrated in FIG. 4. For example, while the contactors MC1 and MC2 are turned off, the load devices 51 and 52 are in a power supply stop state ST1. Once the contactors MC1 and MC2 are turned on and power is supplied to the load devices 51 and 52, the load devices 51 and 52 start up and transition to a standby state ST2. Then, upon acquisition of the operation start command from the management device 62, the load devices 51 and 52 transition to an operation state ST3 and start operations in accordance with the operation start command. In the operation state ST3, upon acquisition of the standby command from the management device 62, the load devices 51 and 52 stop operations and transition to the standby state ST2. In the standby state ST2 or the operation state ST3, upon acquisition of the stop command from the management device 62, the load devices 51 and 52 stop and transition to the power supply stop state ST1.

Figure 5:
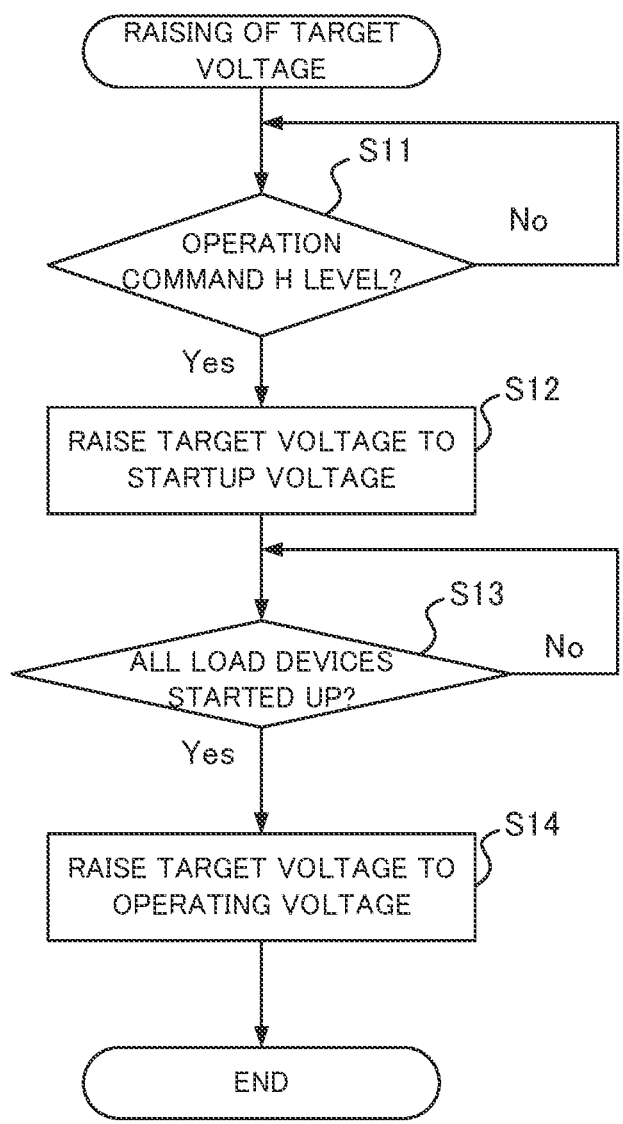
FIG. 5 is a flowchart illustrating a target voltage raising process performed by a target voltage outputter included in the control device according to Embodiment 1.

At startup of the load devices 51 and 52, specifically, at turn-on of the contactors MC1 and MC2, to reduce inrush current flowing in the load devices 51 and 52, the target voltage outputter 20 included in the power conversion device 1 raises the target voltage stepwise as illustrated in FIG. 5. Upon the control device 12 starting up after receiving supply of power from a power source provided for the control device 12, the target voltage outputter 20 starts operation of FIG. 5. Upon change of the operation command S1 to the H level (Yes in step S11), the target voltage outputter 20 raises the target voltage to the startup voltage (step S12). While the operation command S1 is at the L level (No in step S11), the processing of step S11 is repeated.

Then, upon turn-on of the contactors MC1 and MC2 and startup of both of the load devices 51 and 52 (Yes in step S13), the target voltage outputter 20 raises the target voltage to the operating voltage (step S14). Upon completion of the processing of step S14, the target voltage outputter 20 ends the target voltage raising process, and maintains the target voltage at the operating voltage. While all of the load devices 51 and 52 are not starting up (No in step S13), the processing of step S13 is repeated.

As described above, the target voltage outputter 20 raises the target voltage to the operating voltage upon startup of both of the load devices 51 and 52. In other words, while at least one of the load devices 51 and 52 is not starting up, the target voltage outputter 20 maintains the output voltage of the power conversion circuit 11 at the startup voltage to maintain the target voltage at the startup voltage. Since the startup voltage is lower than the operating voltage, inrush current flowing in the load devices 51 and 52 is reduced at turn-on of the contactors MC1 and MC2.

Figure 6:
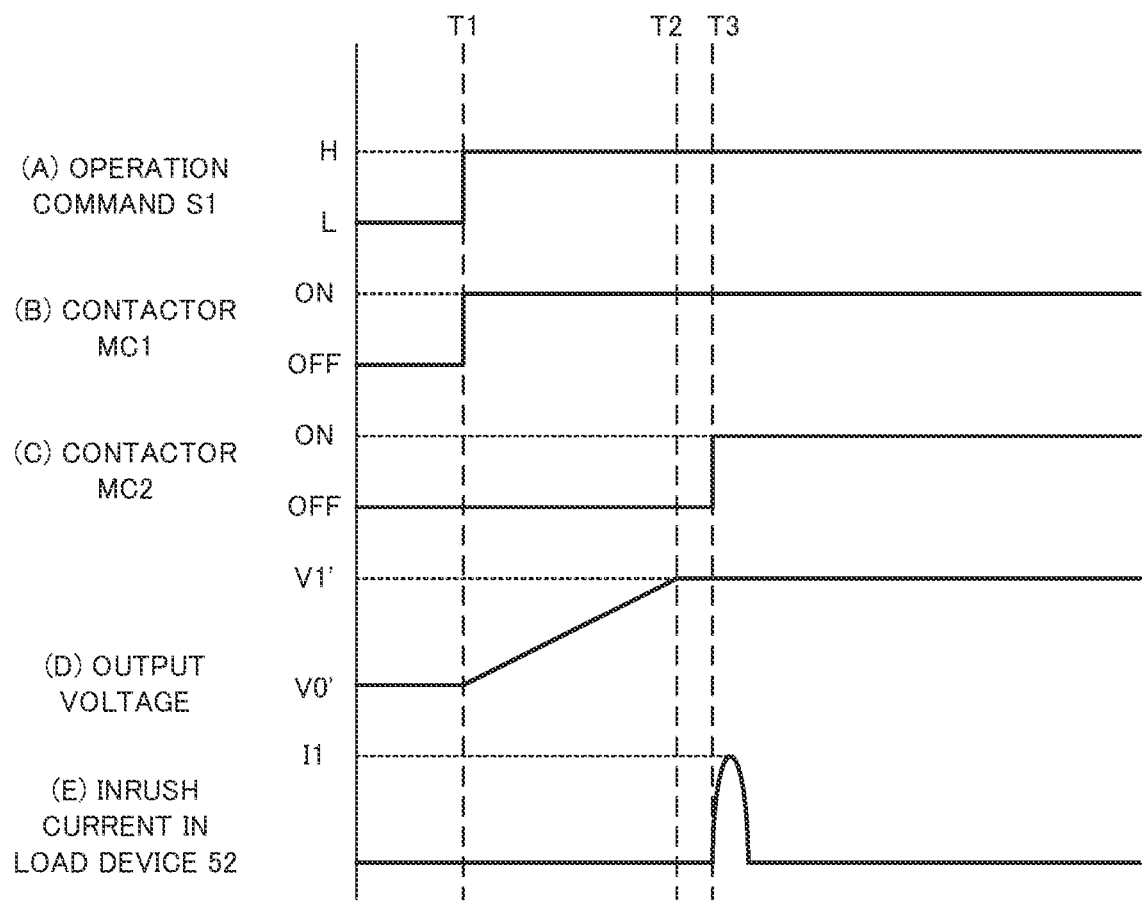
FIG. 6 is a timing chart illustrating operation of a comparative example power conversion device and illustrating (A) an operation command, (B) and (C) states of contactors, (D) an output voltage of the power conversion device, and (E) inrush current flowing in a load device.

The operation of the power conversion device 1 while the target voltage is raised as above is described below in detail. FIG. 6 illustrates as a comparative example a timing chart illustrating operation of the power conversion device disclosed in Patent Literature 1 in a case where the power conversion device supplies power to the load devices 51 and 52 via the contactors MC1 and MC2 similarly to the power conversion device 1.

A time when the operation command changes to the H level and the comparative example power conversion device starts the operation as illustrated in section (A) of FIG. 6 is taken to be T1. The operation starts a linear rise of the output voltage of the comparative example power conversion device from voltage V0' at time T1, as illustrated in section (D) of FIG. 6. A time when the output voltage of the comparative example power conversion device then reaches a voltage V1' is taken to be T2. The voltage V1' is a value included in a rated voltage range of the comparative example power conversion device and is voltage that allows operation of the load devices 51 and 52.

It is assumed that, as illustrated in section (B) of FIG. 6, at time T1, the contactor MC1 is turned on and the load device 51 is electrically connected to the comparative example power conversion device. Since the output voltage of the comparative example power conversion device is sufficiently low at time T1, the flow of inrush current in the load device 51 is suppressed.

It is assumed that, as illustrated in section (C) of FIG. 6, at time T3 after time T2, the contactor MC2 is turned on and the load device 52 is electrically connected to the comparative example power conversion device. Since the output voltage of the comparative example power conversion device reaches the voltage V1' at time T3, inrush current having an amplitude I1 flows in the load device 52, as illustrated in section (E) of FIG. 6.

Figure 7:
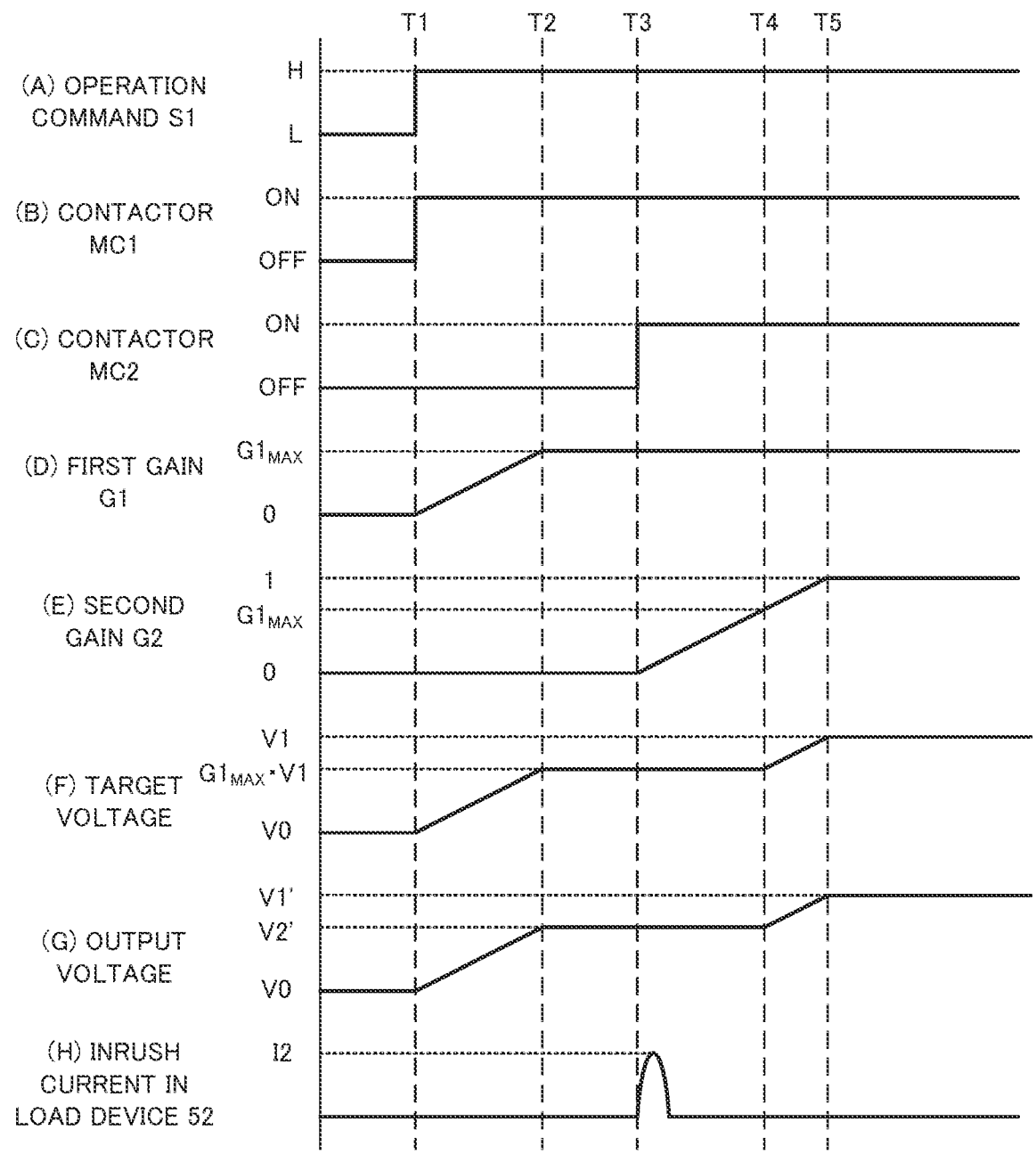
FIG. 7 is a timing chart illustrating operation of the power conversion device according to Embodiment 1 and illustrating (A) an operation command, (B) and (C) states of contactors, (D) a first gain, (E) a second gain, (F) a target voltage, (G) an output voltage, and (H) inrush current flowing in the load device.

FIG. 7 illustrates a timing chart illustrating operation of the power conversion device 1. A time when the operation command S1 changes to the H level and the power conversion device 1 starts the operation as illustrated in section (A) of FIG. 7 is taken to be T1. It is assumed that, at time T1, as illustrated in section (B) of FIG. 7, the contactor MC1 is turned on, and the load device 51 is electrically connected to the power conversion device 1 and starts up. At time T1, as illustrated in section (G) of FIG. 7, the output voltage of the power conversion circuit 11 is so low that flow of inrush current in the load device 51 is suppressed.

Upon change of the operation command S1 to the H level at time T1, the target voltage outputter 20 included in the control device 12 starts output of the target voltage, and the element controller 30 included in the control device 12 starts generation of the switching command S3 in accordance with the target voltage.

Specifically, upon change of the operation command S1 to the H level, the operating voltage output circuit 21 outputs the operating voltage V1, and the first gain output circuit 22 increases a value G1 of the first gain from 0 to a maximum value $G1_{MAX}$ of the first gain, which is less than 1. A time when the value G1 of the first gain reaches the maximum value $G1_{MAX}$ as illustrated in section (D) of FIG. 7 is taken to be T2.

It is assumed that, as illustrated in section (C) of FIG. 7, the contactor MC2 is turned off until time T2. In other words, the load device 52 is assumed to have not started up at time T2. Since the load device 52 is not starting up, a value G2 of the second gain output by the second gain output circuit 23 remains 0, as illustrated in section (E) of FIG. 7. Thus, from time T1 to time T2, the multiplier 25 outputs a result G1·V1 obtained by multiplying the operating voltage V1 output by the operating voltage output circuit 21 by the value G1 of the first gain output by the maximum output circuit 24. After the first gain output circuit 22 increases the value G1 of the first gain to the maximum $G1_{MAX}$ of the first gain, the output value of the multiplier 25 reaches the startup voltage that is a result obtained by multiplying the operating voltage V1 by the maximum $G1_{MAX}$ of the first gain.

By the element controller 30 generating the switching command S3 in accordance with the target voltage and the switching element SW1 included in the power conversion circuit 11 being controlled based on the switching command S3, the output voltage of the power conversion circuit 11 starts to rise at time T1 and reaches the voltage V2' at time T2, as illustrated in section (G) of FIG. 7. The voltage V2' is a value that can be regarded to be the same as the startup voltage $G1_{MAX}$·V1 that is the target voltage at time T2.

A time when the contactor MC2 is then turned on and the load device 52 is electrically connected to the power conversion device 1 and starts up as illustrated in section (C) of FIG. 7 is taken to be T3. At the time T3, as illustrated in section (G) of FIG. 7, the output voltage of the power conversion circuit 11 is less than the voltage V1' that is a value that can be regarded to be the same as the operating voltage V1, and thus inrush current flowing in the load device 52 is small compared with the case of the comparative example power conversion device illustrated in FIG. 6. Since an amplitude of inrush current is proportional to the output voltage of the power conversion circuit 11, the amplitude I2 of the inrush current flowing in the load device 52 is $G1_{MAX}$ times as much as the amplitude I1 of the inrush current flowing in the load device 52 connected to the comparative example power conversion device.

Upon startup of both of the load devices 51 and 52, the second gain output circuit 23 increases the value G2 of the second gain from 0 to 1. A time when the value G2 of the second gain reaches the maximum $G1_{MAX}$ of the first gain as illustrated in section (E) of FIG. 7 is taken to be T4. A time when the value G2 of the second gain then reaches the maximum 1 is taken to be T5. Since the output value of the second gain output circuit 23 is greater than the output value of the first gain output circuit 22 on and after time T4, the target voltage outputter 20 outputs a result G2·V1 obtained by multiplying the operating voltage V1 by the value G2 of the second gain.

By the element controller 30 generating the switching command S3 in accordance with the target voltage and the switching element SW1 included in the power conversion circuit 11 being controlled based on the switching command S3, the output voltage of the power conversion circuit 11 starts to rise again at time T4 and reaches the voltage V1' at time T5, as illustrated in section (G) of FIG. 7. The voltage V1' is a value that can be regarded to be the same as the operating voltage V1. The output voltage of the power conversion circuit 11 reaching the operating voltage V1 enables both the load devices 51 and 52 to operate.

As described above, the target voltage outputter 20 included in the control device 12 according to Embodiment 1 raises the target voltage to the startup voltage $G1_{MAX}·V1$ upon change of the operation command S1 to the H level. Then, after turn-on of the contactors MC1 and MC2 and startup of both of the load devices 51 and 52, the target voltage outputter 20 raises the target voltage to the operating voltage V1. The output voltage of the power conversion circuit 11 at turn-on of the contactor MC2 connected to the load device 52 that starts up with delay is the startup voltage $G1_{MAX}·V1$ that is less than the operating voltage V1. Since an amplitude of inrush current is proportional to the output voltage of the power conversion circuit 11, the inrush flowing in the load device 52 is reduced.

Embodiment 2

The method for adjusting the target voltage is not limited to the above-described examples. A power conversion device 2 including a control device 13 that acquires states of contactors MC1, MC2, and MC3 from a switching device 61 and raises the target voltage to the starting voltage stepwise is described in Embodiment 2, focusing on points different from the power conversion device 1.

Figure 8:
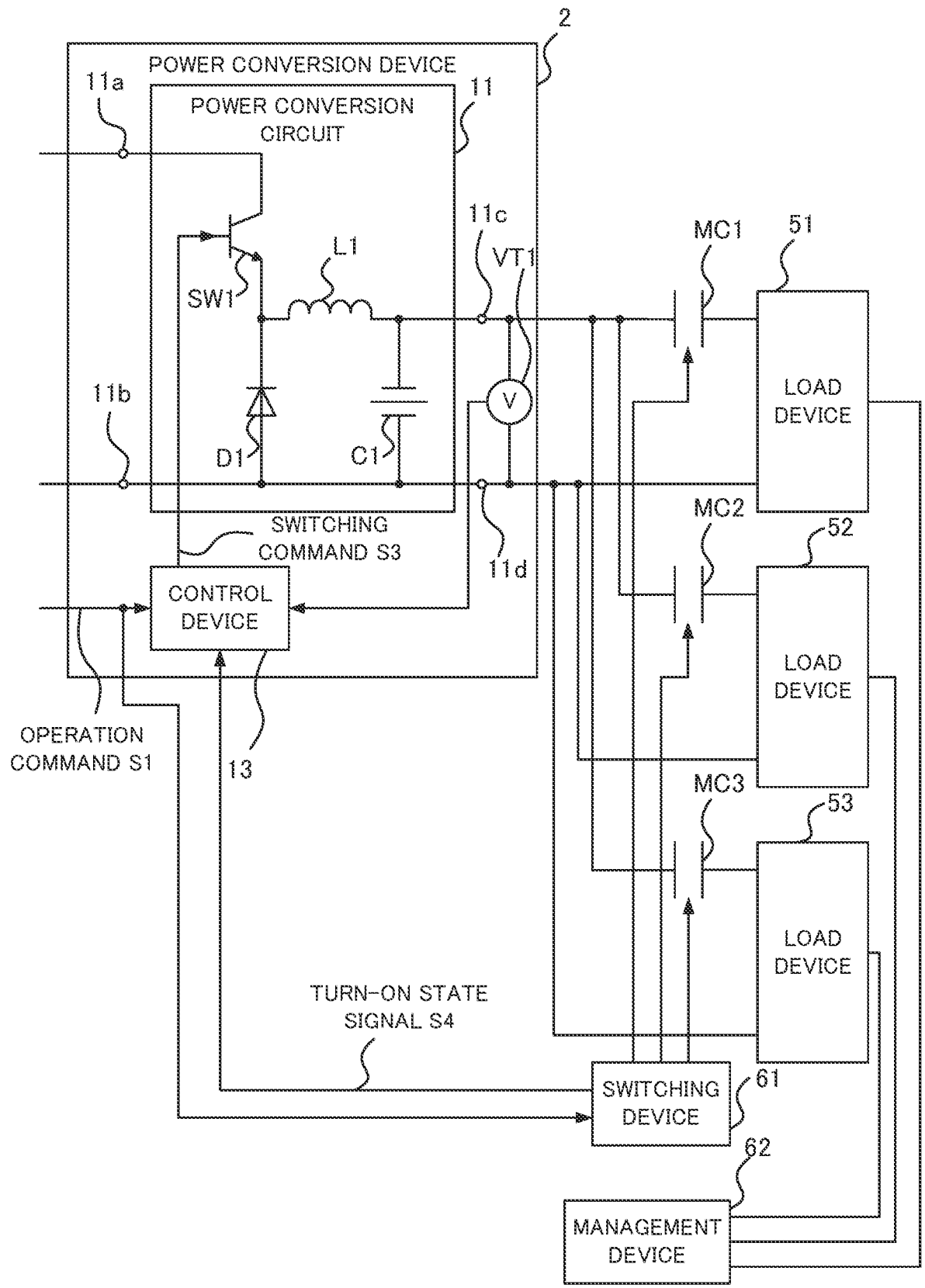
FIG. 8 is a block diagram of a power conversion device according to Embodiment 2.

The power conversion device 2 according to Embodiment 2 illustrated in FIG. 8 converts power supplied from a power source into power to be supplied to load devices 51, 52, and 53, and supplies the power resulting from the conversion to the load devices 51, 52, and 53. The load devices 51, 52, and 53 are electrically connected to the power conversion device 2 via the contactors MC1, MC2, and MC3, respectively.

The contactor MC3 is a DC electro-magnetic contactor similarly to the contactors MC1 and MC2, and is controlled by the switching device 61. Upon turn-on of the contactor MC3 by the switching device 61, the load device 53 is electrically connected to the power conversion device 2. Upon turn-off of the contactor MC3 by the switching device 61, the load device 53 is electrically disconnected from the power conversion device 2.

Upon change of the operation command S1 to the H level, the switching device 61 turns on the contactors MC1, MC2, and MC3 at a predetermined timing and in a predetermined order. In Embodiment 2, the switching device 61 turns on the contactor MC1 upon change of the operation command S1 to the H level. Then, upon passage of a fixed time from turn-on of the contactor MC1, the switching device 61 turns on the contactor MC2. Then, upon passage of a fixed time from turn-on of the contactor MC2, the switching device 61 turns on the contactor MC3.

The power conversion device 2 includes the voltage conversion circuit 11, the voltage measurer VT1, and a control device 13 that controls the switching element SW1 included in the power conversion circuit 11.

Figure 9:
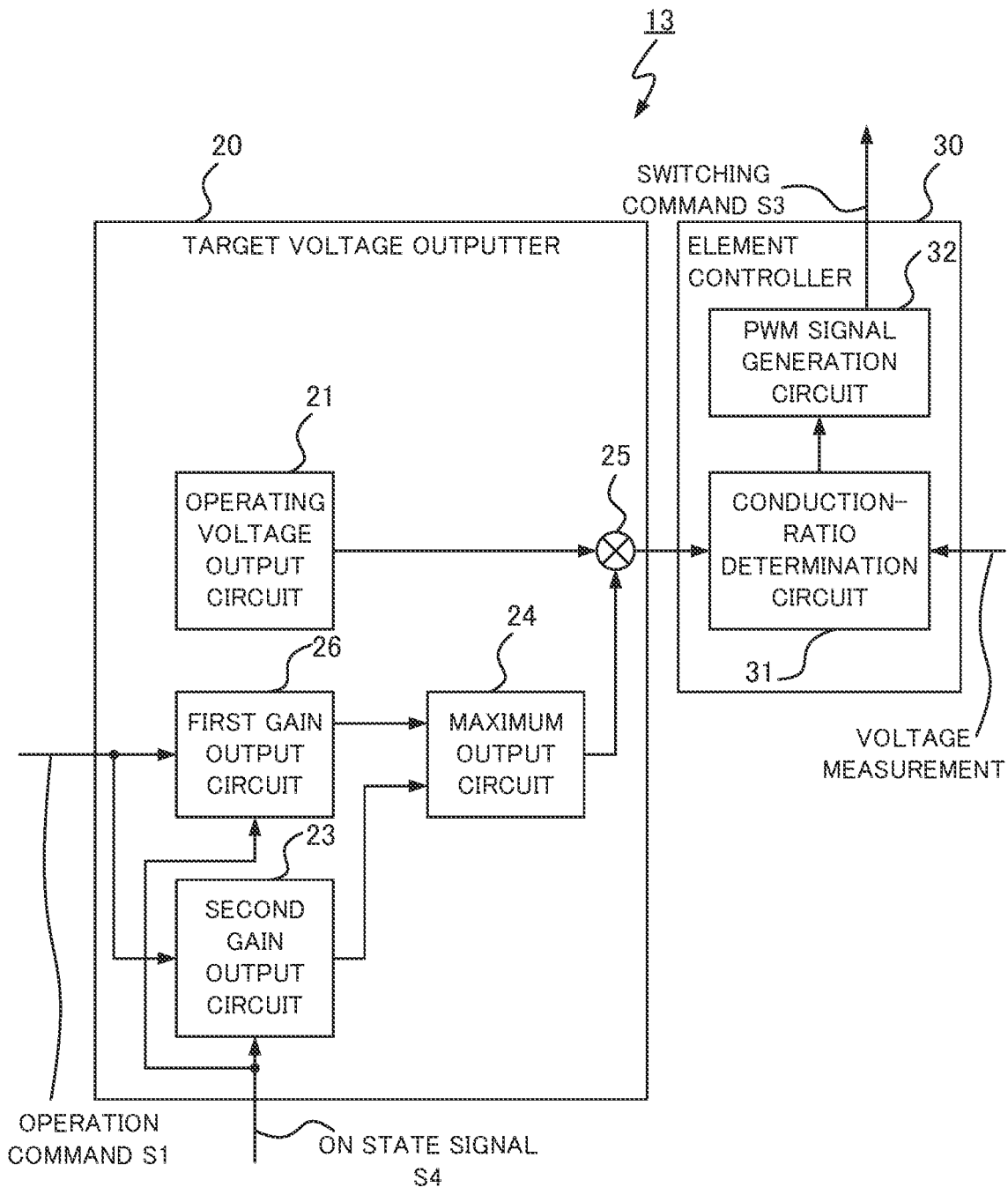
FIG. 9 is a block diagram of a control device according to Embodiment 2.

As illustrated in FIG. 9, the configuration of the control device 13 is basically the same as that of the control device 12 included in the power conversion device 1 according to Embodiment 1, except that, as illustrated in FIGS. 8 and 9, the control device 12 acquires from the switching device 61 a turn-on state signal S4 indicating whether or not each of the contactors MC1, MC2, and MC3 is turned on and determines based on the turn-on state signal S4 whether the load devices 51, 52, and 53 are starting up. Specifically, as illustrated in FIG. 9, a first gain output circuit 26 and the second gain output circuit 23 acquire the turn-on state signal S4 from the switching device 61.

The first gain output circuit 26 outputs a value of the first gain that is 0 while the operation command S1 is at the L level, similarly to Embodiment 1. Upon change of the operation command S1 to the H level, the first gain output circuit 26 increases a value G1 of the first gain from 0 to an intermediate value that is smaller than the maximum $G1_{MAX}$ of the first gain.

Then, upon startup of determined some of the load devices 51, 52, and 53, for example, both of the load devices 51 and 52, the first gain output circuit 26 increases the value G1 of the first gain from the intermediate value to the maximum $G1_{MAX}$ of the first gain. Specifically, in a case where the turn-on state signal S4 indicates that the contactors MC1 and MC2 are turned on and the contactor MC3 is not turned on, the first gain output circuit 26 increase the value G1 of the first gain to the maximum $G1_{MAX}$ of the first gain.

The second gain output circuit 23 outputs the value G2 of the second gain being 0 while the operation command S1 is at the L level or the turn-on state signal S4 indicates that at least one of the contactors MC1, MC2, and MC3 are turned off. In a case where the operation command S1 changes to the H level, and the turn-on state signal S4 indicates that all of the contactors MC1, MC2, and MC3 are turned on, the second gain output circuit 23 increase the value G2 of the second gain from 0 to 1.

It is assumed that the output value of the multiplier 25 in a case where the output value of the maximum output circuit 24 is an intermediate value $G1_{MID}$ of the first gain is a partial-startup voltage that is less than the startup voltage.

A hardware configuration of the control device 13 is basically the same as that of the control device 12, except that the processing circuit 71 implementing the control device 13 is connected through the interface circuit 72 to the power conversion circuit 11, specifically, the switching element SW1, the voltage measurer VT1, and the switching device 61.

Figure 10:
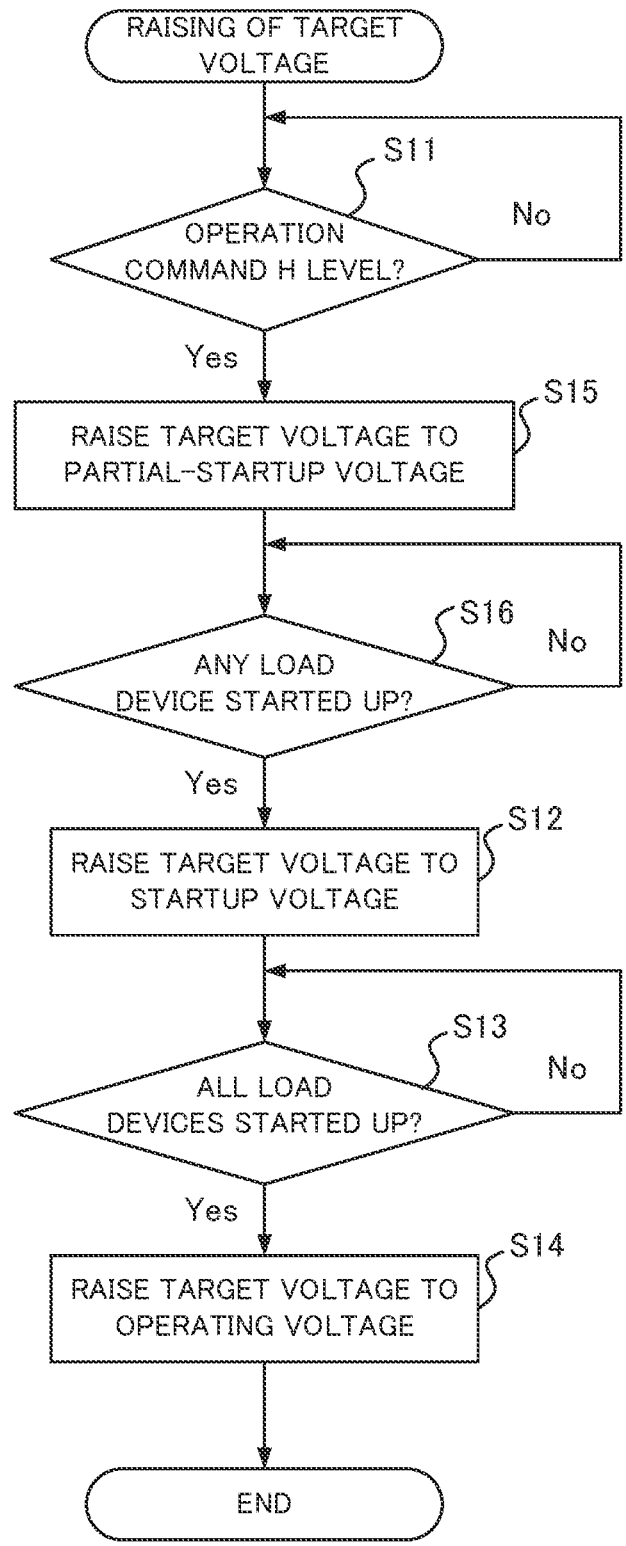
FIG. 10 is a flowchart illustrating a target voltage raising process performed by a target voltage outputter included in the control device according to Embodiment 2.

At startup of the load devices 51, 52, and 53, specifically, at turn-on of the contactors MC1, MC2, and MC3, to reduce inrush current flowing in the load devices 51, 52, and 53, the target voltage outputter 20 included in the power conversion device 2 raises the target voltage stepwise upon change of the operation command S1 to the H level, as illustrated in FIG. 10. Upon the control device 13 starting up after receiving supply of power from a power source provided for the control device 13, the target voltage outputter 20 starts operation of FIG. 10. Upon change of the operation command S1 to the H level (Yes in step S11), the target voltage outputter 20 raises the target voltage to the partial-startup voltage (step S15). While the operation command S1 is at the L level (No in step S11), the processing of step S11 is repeated.

Then, upon turn-on of the contactors MC1 and MC2 and startup of the load devices 51 and 52 that are some determined ones of the load devices 51, 52, and 53 (Yes in step S16), the target voltage outputter 20 raises the target voltage to the startup voltage (step S12). While at least one of the load devices 51 and 52 is not starting up (No in step S16), the processing of the step S16 is repeated.

Upon further turn-on of the contactor MC3 and startup of all of the load devices 51, 52, and 53 (Yes in step S13), the target voltage outputter 20 raises the target voltage to the operating voltage (step S14). Upon completion of the processing of step S14, the target voltage outputter 20 ends the target voltage raising process, and maintains the target voltage at the operating voltage. While all of the load devices 51, 52, and 53 are not starting up (No in step S13), the processing of step S13 is repeated.

As described above, the target voltage outputter 20 raises the target voltage to the startup voltage upon startup of both of the load devices 51 and 52. Thus, inrush current flowing in the load device 52 is reduced compared with the inrush current in Embodiment 1.

Figure 11:
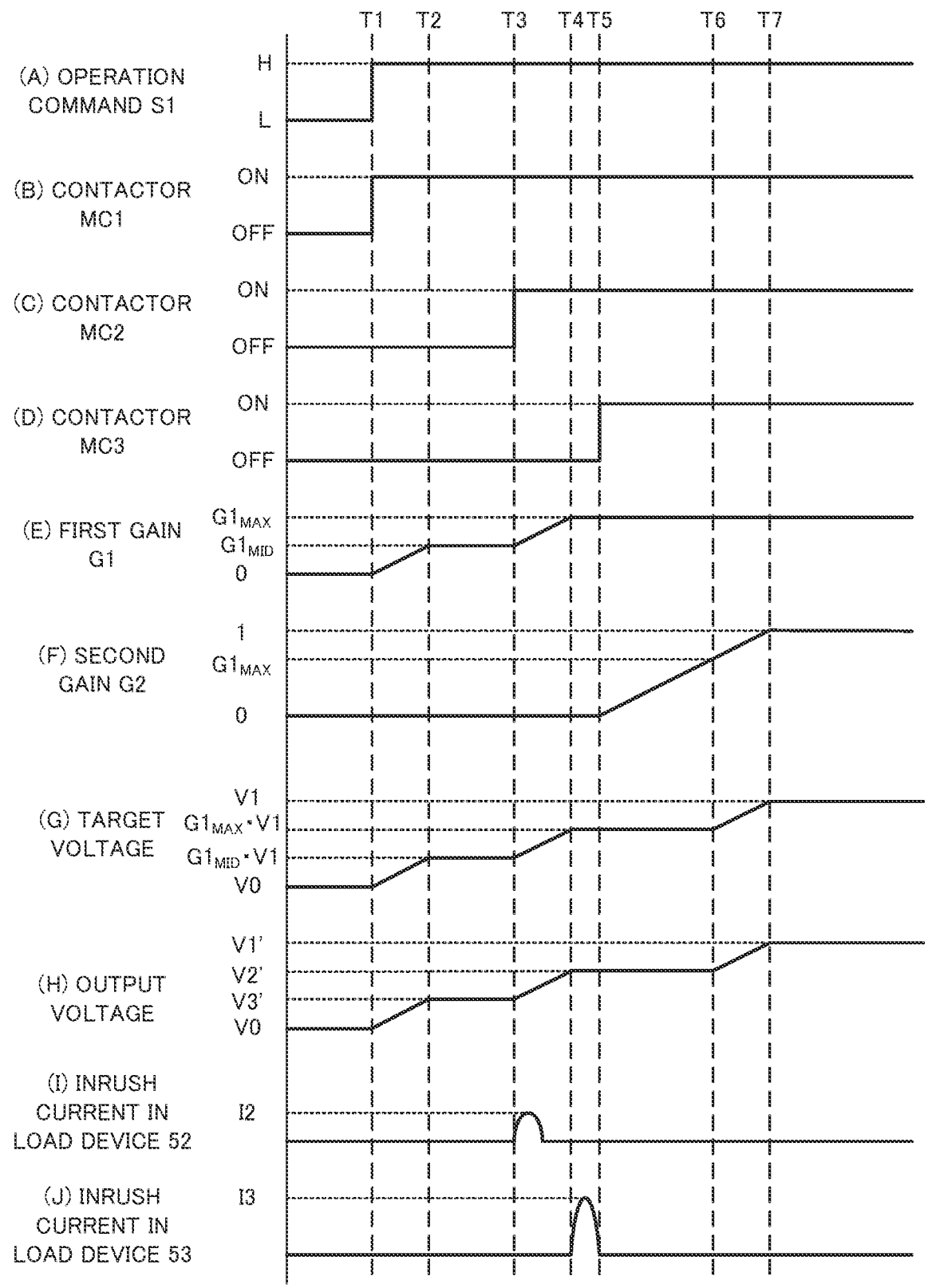
FIG. 11 is a timing chart illustrating output of the power conversion device according to Embodiment 2 and illustrating (A) an operation command, (B), (C), and (D) states of contactors, (E) a first gain, (F) a second gain, (G) a target voltage, (H) an output voltage, and (I) and (J) inrush current flowing in a load device.

The operation of the power conversion device 2 while the target voltage is raised as above is described below in detail. FIG. 11 illustrates a timing chart for description of operation of the power conversion device 2. A time when the operation command changes to the H level and the power conversion device 2 starts the operation as illustrated in section (A) of FIG. 11 is taken to be T1. It is assumed that, as illustrated in section (B) of FIG. 11, at time T1, the contactor MC1 is turned on and the load device 51 is electrically connected to the power conversion device 2 and starts up. At time T1, as illustrated in section (H) of FIG. 11, the output voltage of the power conversion circuit 11 is low enough to suppress flow of inrush current in the load device 51.

At time T1, upon change of the operation command S1 to the H level, the target voltage outputter 20 included in the control device 13 starts output of the target voltage, and the element controller 30 included in the control device 13 starts generation of the switching command S3 in accordance with the target voltage.

Specifically, upon change of the operation command S1 to the H level, the operating voltage output circuit 21 outputs the operating voltage V1, and the first gain output circuit 26 increases the value G1 of the first gain to the intermediate value $G1_{MID}$ that is less than the maximum $G1_{MAX}$ of the first gain. A time when the value G1 of the first gain reaches the intermediate value $G1_{MID}$ as illustrated in section (E) of FIG. 11 is taken to be T2.

It is assumed that, as illustrated in section (C) of FIG. 11, the contactors MC2 and MC3 are turned off until T3. In other words, the load devices 52 and 53 are assumed to have not started up at time T3. Since the load devices 52 and 53 are not starting up, the value G2 of the second gain output by the second gain output circuit 23 remains 0, as illustrated in section (F) of FIG. 11. Thus, from time T1 to time T2, the multiplier 25 outputs a result G1·V1 obtained by multiplying the operating voltage V1 output by the operating voltage output circuit 21 by the value G1 of the first gain output by the maximum output circuit 24. After the first gain output circuit 22 increases the value G1 of the first gain to the intermediate value $G1_{MID}$, the output value of the multiplier 25 reaches the partial-startup voltage that is a result obtained by multiplying the operating voltage V1 by the intermediate value $G1_{MID}$.

By the element controller 30 generating the switching command S3 in accordance with the target voltage and the switching element SW1 included in the power conversion circuit 11 being controlled based on the switching command S3, the output voltage of the power conversion circuit 11 starts to rise at time T1 and reaches the voltage V3' at time T2, as illustrated in section (H) of FIG. 11. The voltage V3' is a value that can be regarded to be the same as the partial-startup voltage $G1_{MID}$·V1 that is the target voltage at time T2.

A time when the contactor MC2 is then turned on and the load device 52 is electrically connected to the power conversion device 2 and starts up as illustrated in section (C) of FIG. 11 is taken to be T3. At the time T3, as illustrated in section (H) of FIG. 11, the output voltage of the power conversion circuit 11 is less than the voltage V1' that is a value that can be regarded to be the same as the operating voltage V1, and thus inrush current flowing in the load device 52 is small compared with the case of the comparative example power conversion device described in Embodiment 1. Since an amplitude of inrush current is proportional to the output voltage of the power conversion circuit 11, the amplitude I3 of the inrush current flowing in the load device 52 is $G1_{MID}$ times as much as the amplitude I1 of the inrush current flowing in the load device 52 connected to the comparative example power conversion device.

Upon startup of both of the load devices 51 and 52, the first gain output circuit 26 increases the value G1 of the first gain from the intermediate value $G1_{MID}$ to the maximum $G1_{MAX}$ of the first gain. A time when the value G1 of the first gain reaches the maximum $G1_{MAX}$ as illustrated in section (E) of FIG. 11 is taken to be T4. It is assumed that, as illustrated in section (D) of FIG. 11, the contactor MC3 is turned off from time T1 to time T4. In other words, the load device 53 is assumed to have not started up at time T4. Thus, as illustrated in section (F) of FIG. 11, the value G2 of the second gain output by the second gain output circuit 23 remains 0. Thus, from time T2 to time T4, the multiplier 25 outputs a result G1·V1 obtained by multiplying the operating voltage V1 output by the operating voltage output circuit 21 by the value G1 of the first gain output by the maximum output circuit 24.

By the element controller 30 generating the switching command S3 in accordance with the target voltage and the switching element SW1 included in the power conversion circuit 11 being controlled based on the switching command S3, the output voltage of the power conversion circuit 11 starts to rise again at time T3 and reaches the voltage V2' at time T4, as illustrated in section (H) of FIG. 11. The voltage V2' is a value that can be regarded to be the same as the startup voltage $G1_{MAX}$·V1.

A time when the contactor MC3 is then turned on and the load device 53 is electrically connected to the power conversion device 2 and starts up as illustrated in section (D) of FIG. 11 is taken to be T5. At time T5, as illustrated in section (H) of FIG. 11, the output voltage of the power conversion circuit 11 is less than the voltage V1' that is a value that can be regarded to be the same as the operating voltage V1, and thus the inrush current flowing in the load device 53 is small compared with the case of the comparative example power conversion device described in Embodiment 1. Since an amplitude of inrush current is proportional to the output voltage of the power conversion circuit 11, the amplitude I3 of the inrush current flowing in the load device 53 is $G1_{MAX}$ times as much as the amplitude I1 of the inrush current flowing in the load device connected to the comparative example power conversion device.

Upon startup of all of the load devices 51, 52, and 53, the second gain output circuit 23 increases the value G2 of the second gain from 0 to 1. A time when the value G2 of the second gain reaches the maximum value $G1_{MAX}$ of the first gain as illustrated in section (F) of FIG. 11 is taken to be T6. A time when the value G2 of the second gain then reaches the maximum 1 is taken to be T7. Since the output value of the second gain output circuit 23 is greater than the output value of the first gain output circuit 26 on and after time T6, the target voltage outputter 20 outputs a result G2·V1 obtained by multiplying the operating voltage V1 by the value G2 of the second gain.

By the element controller 30 generating the switching command S3 in accordance with the target voltage and the switching element SW1 included in the power conversion circuit 11 being controlled based on the switching command S3, as illustrated in section (H) of FIG. 11, the output voltage of the power conversion circuit 11 starts to rise again at time T6 and reaches the voltage V1' at time T7. The voltage V1' is a value that can be regarded to be the same as the operating voltage V1. The output voltage of the power conversion circuit 11 reaching the operating voltage V1 enables all of the load devices 51, 52, and 53 to operate.

As described above, the target voltage outputter 20 included in the control device 13 according to Embodiment 2 raises the target voltage to the partial-startup voltage $G1_{MID}$·V1 upon change of the operation command S1 to the H level. Then, upon startup of the determined some of the load devices 51, 52, and 53, specifically, both of the load devices 51 and 52, the target voltage outputter 20 raises the target voltage to the startup voltage $G1_{MAX}$·V1. Then, after startup of all of the load devices 51, 52, and 53, the target voltage outputter 20 raises the target voltage to the operating voltage V1.

The output voltage of the power conversion circuit 11 at turn-on of the contactor MC2 connected to the load device 52 that starts up with delay is the partial-startup voltage $G1_{MID}$·V1 that is less than the operating voltage V1. The output voltage of the power conversion circuit 11 at turn-on of the contactor MC3 connected to the load device 53 that starts up with delay is the startup voltage $G1_{MAX}$·V1 that is less than the operating voltage V1. Since an amplitude of inrush current is proportional to the output voltage of the power conversion circuit 11, the inrush flowing in the load devices 52 and 53 is reduced.

The present disclosure is not limited to the above-described embodiments. The hardware configurations and flowcharts described above are examples and changes and modifications can be added thereto as appropriate.

Figure 12:
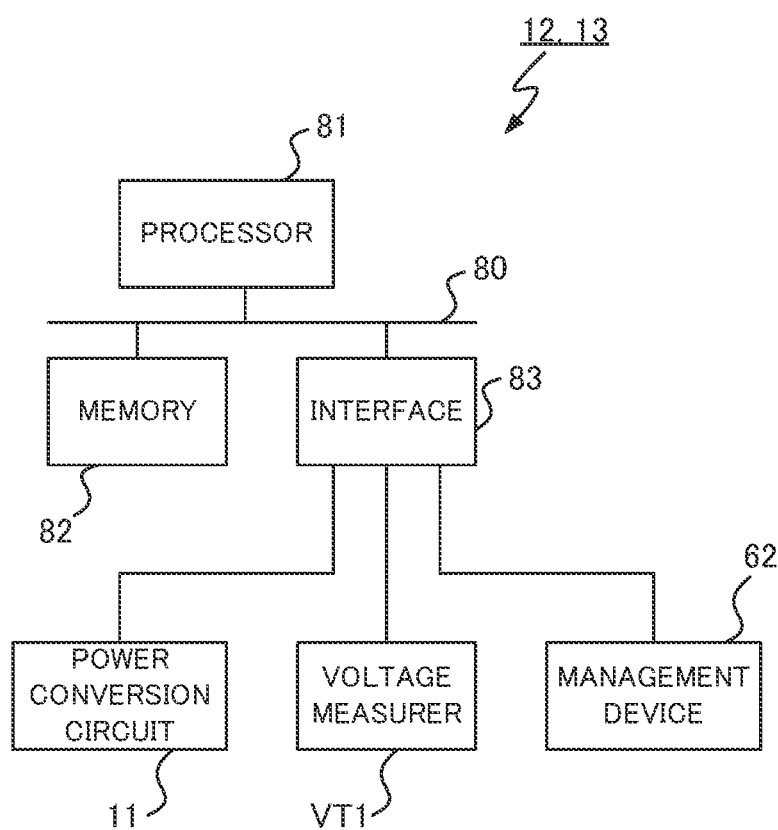
FIG. 12 is a modified example of the hardware configuration of the control device according to the embodiments.

The functions of the control devices 12 and 13 may be implemented by software. In this case, as illustrated in FIG. 12, the control devices 12 and 13 include a processor 81, a memory 82, and an interface 83. The processor 81, the memory 82, and the interface 83 are connected via a bus 80 to one another.

The functions of the control devices 12 and 13 are implemented by software, firmware, or a combination of software and firmware. The software and the firmware are described as programs and stored in a memory 82. The above-described functions of the components are achieved by the processor 81 reading and executing the programs stored in the memory 82. That is, the memory 82 stores programs for executing processing of the control devices 12 and 13.

The memory 82 includes, for example, a non-volatile or volatile semiconductor memory, such as a random access memory (RAM), a read-only memory (ROM), a flash memory, an erasable programmable read-only memory (EPROM), an electrically erasable and programmable read-only memory (EEPROM), a magnetic disk, a flexible disk, an optical disc, a compact disc, a mini disc, a digital versatile disc (DVD), and the like.

A part of each function of the control devices 12 and 13 may be implemented by dedicated hardware and another part thereof may be implemented by software or firmware. For example, the element controller 30 may be implemented by the processing circuit 71 illustrated in FIG. 3, and the target voltage outputter 20 may be implemented by the processor 81 illustrated in FIG. 12 reading and executing the program stored in the memory 82.

The configurations of the power conversion devices 1 and 2 are not limited the above-described examples. As an example, the configurations of the power conversion devices 1 and 2 may include, as the power conversion circuit 11, a converter that converts supplied alternating current (AC) power into DC power or an inverter that converts supplied DC power into AC power. In a case where the power conversion devices 1 and 2 include the inverter, the target voltage outputter included in the control devices 12 and 13 may output the target value of the amplitude of the output voltage of the power conversion circuit 11.

The number of switching elements included in the power conversion circuit 11 is freely selected. The switching element SW1 is not limited to the IGBT but any element capable of switching operation. As an example, the switching element SW1 may be a metal-oxide-semiconductor field-effect transistor (MOSFET), a thyristor, or the like.

In a case where the load devices 51, 52, and 53 include a breaker inside, omission of the contactors MC1, MC2, and MC3 is permissible.

A way of raising the target voltage by the target voltage outputter 20 is not limited to the above-described examples. As an example, the first gain output circuits 22 and 26 included in the target voltage outputter 20 may increase the first gain in accordance with a monotonically increasing curve. The same applies to the second gain output circuit 23.

As another example, the first gain output circuits 22 and 26 included in the target voltage outputter 20 may increase the first gain discontinuously based on a step function. The same applies to the second gain output circuit 23. As a result, the target voltage rises discontinuously.

As another example, in a case where the load device made of an element having low allowable current has started up, the target voltage outputter 20 may raise the target voltage to the operating voltage even when all of the load devices have not started up. In other words, before the load device made of an element that can withstand high current starts up, the target voltage outputter 20 may raise the target voltage to the operating voltage.

The first gain output circuit 26 included in the target voltage outputter 20 included in the control device 13 may previously hold intermediate values and increase the first gain stepwise.

The management device 62 may be implemented as a function of a train information management system.

The power conversion devices 1 and 2 are not limited to a railway vehicle but may be provided in a mobile object, such as an automobile, a ship. The power conversion device 1 and 2 may be provided in any place, instead of being provided in the mobile object.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2 Power conversion device
11 Power conversion circuit
11a, 11b Input terminal
11c, 11d Output terminal
12, 13 Control device
20 Target voltage outputter
21 Operating voltage output circuit
22, 26 First gain output circuit
23 Second gain output circuit
24 Maximum output circuit
25 Multiplier
30 Element controller
31 Conduction-ratio determination circuit
32 PWM signal generation circuit
51, 52, 53 Load device
61 Switching device
62 Management device
71 Processing circuit
72 Interface circuit
80 Bus
81 Processor
82 Memory
83 Interface
C1 Capacitor
D1 Diode
L1 Reactor
MC1, MC2, MC3 Contactor
S1 Operation command
S2 Operation state signal
S3 Switching command
S4 Turn-on state signal
SW1 Switching element
VT1 Voltage measurer

The invention claimed is:

1. A control device for controlling one or more switching elements included in a power conversion circuit that converts supplied power into power to be supplied to load devices and supplies the power resulting from the conversion to the load devices, the control device comprising:
a target voltage outputting circuitry to output a target voltage that is a target value of output voltage of the power conversion circuit; and
an element control circuitry to control the one or more switching elements in accordance with the target voltage,
wherein upon acquisition of an operation command that provides an instruction for startup of the power conversion circuit, the target voltage outputting circuitry raises the target voltage to a startup voltage that is below a rated voltage range of the power conversion circuit, and
in a case where at least one of the load devices starts up after acquisition of the operation command, the target voltage outputting circuitry raises the target voltage to an operating voltage that is greater than the startup voltage and is within the rated voltage range of the power conversion circuit.

2. The control device according to claim 1, wherein the target voltage outputting circuitry raises the target voltage to the operating voltage in a case where the load devices start up after acquisition of the operation command.

3. The control device according to claim 2, wherein, upon acquisition of the operation command, the target voltage outputting circuitry raises the target voltage to a partial-startup voltage that is output voltage of the power conversion circuit that enables startup of at least one of the load devices, the partial-startup voltage being less than the startup voltage.

4. The control device according to claim 3, wherein the target voltage outputting circuitry raises the target voltage to the startup voltage in a case where the at least one of the load devices starts up after raising of the target voltage to the partial-startup voltage.

5. The control device according to claim 1, wherein
the load devices are connected to the power conversion circuit via contactors that are provided for the corresponding load devices, and
upon turn-on of any of the contactors, the target voltage outputting circuitry determines that the load device connected to the power conversion circuit via the contactor has started up.

6. The control device according to claim 2, wherein
the load devices are connected to the power conversion circuit via contactors that are provided for the corresponding load devices, and
upon turn-on of any of the contactors, the target voltage outputting circuitry determines that the load device connected to the power conversion circuit via the contactor has started up.

7. The control device according to claim 3, wherein
the load devices are connected to the power conversion circuit via contactors that are provided for the corresponding load devices, and
upon turn-on of any of the contactors, the target voltage outputting circuitry determines that the load device connected to the power conversion circuit via the contactor has started up.

8. The control device according to claim 4, wherein
the load devices are connected to the power conversion circuit via contactors that are provided for the corresponding load devices, and
upon turn-on of any of the contactors, the target voltage outputting circuitry determines that the load device connected to the power conversion circuit via the contactor has started up.

9. The control device according to claim 1, wherein the target voltage outputting circuitry acquires an operation state signal indicating a state of each of the load devices from a management device that controls the load devices, and determines in accordance with the operation state signal whether the load device has started up.

10. The control device according to claim 2, wherein the target voltage outputting circuitry acquires an operation state signal indicating a state of each of the load devices from a management device that controls the load devices, and determines in accordance with the operation state signal whether the load device has started up.

11. The control device according to claim 3, wherein the target voltage outputting circuitry acquires an operation state signal indicating a state of each of the load devices from a management device that controls the load devices, and determines in accordance with the operation state signal whether the load device has started up.

12. The control device according to claim 4, wherein the target voltage outputting circuitry acquires an operation state signal indicating a state of each of the load devices from a management device that controls the load devices, and determines in accordance with the operation state signal whether the load device has started up.

13. The control device according to claim 1, wherein the target voltage outputting circuitry continuously raises the target voltage to the startup voltage upon acquisition of the operation command that provides the instruction for startup of the power conversion circuit.

14. The control device according to claim 2, wherein the target voltage outputting circuitry continuously raises the target voltage to the startup voltage upon acquisition of the operation command that provides the instruction for startup of the power conversion circuit.

15. The control device according to claim 3, wherein the target voltage outputting circuitry continuously raises the target voltage to the startup voltage upon acquisition of the operation command that provides the instruction for startup of the power conversion circuit.

16. The control device according to claim 1, wherein the target voltage outputting circuitry continuously raises the target voltage to the operating voltage in a case where at least one of the load devices has started up upon acquisition of the operation command.

17. The control device according to claim 2, wherein the target voltage outputting circuitry continuously raises the target voltage to the operating voltage in a case where at least one of the load devices has started up upon acquisition of the operation command.

18. The control device according to claim 3, wherein the target voltage outputting circuitry continuously raises the target voltage to the operating voltage in a case where at least one of the load devices has started up upon acquisition of the operation command.

19. A power conversion device, comprising:
    a power conversion circuit to convert supplied power into power to be supplied to load devices and supply the power resulting from the conversion to the load devices; and
    the control device according to claim 1, to control one or more switching elements included in the power conversion circuit.

20. A control method for controlling one or more switching elements included in a power conversion circuit that converts supplied power into power to be supplied to load devices and supplies the power resulting from the conversion to the load devices,
    the method comprising:
    assigning a target value of voltage of the power conversion circuit by a target voltage outputting circuitry;
    adjusting at startup of the power conversion circuit, the target voltage that is a target value of output voltage of the power conversion circuit to the startup voltage that is below a rated voltage range of the power conversion circuit;
    adjusting, in a case where at least one of the load devices has started up, the target voltage to an operating voltage that is greater than the startup voltage and is within the rated voltage range of the power conversion circuit;
    and controlling the one or more switching elements in accordance with the target voltage by an element control circuitry.

* * * * *